United States Patent Office 2,730,542
Patented Jan. 10, 1956

2,730,542
PROCESS FOR PREPARING ETHANOL-2-AMINO-PHOSPHORIC ACID

Vittorio Emiliano Ferrari and Giorgio Ferrari, Pavia, Italy

No Drawing. Application May 20, 1952, Serial No. 288,948

Claims priority, application Italy June 25, 1951

1 Claim. (Cl. 260—461)

It is known that it is possible to obtain the ethanol-2-aminophosphoric acid from monoethanolamine either by prolonged boiling the latter with phosphoric acid and phosphoric anhydride (Biochem. J., 31, page 398, 1937) or by action of polyphosphoric acid (Helv., 29, page 2006, 1946) or by action of ordinary phosphoric acid on ethylenamine (J. Biol. Chem. 135, page 399, 1940).

All these products give low outputs of ethanol-2-aminophosphoric acid. Moreover, the separation and purification of the ester are very complicated owing to the great excess of acids employed in the preparation.

Further, the reagents employed must be anhydrous.

It has now been found that the preparation of ethanol-2-aminophosphoric acid can be carried out in a very simple manner by using solutions of monoethanolamine and phosphoric acid, or solutions of acid phosphate of monoethanolamine. In view of the above object this invention relates to a process for obtaining ethanol-2-aminophosphoric acid hereinafter specified and explained in a particular case in the example. The details relative to the manner of carrying the invention into practice, however, show only one of the different ways of applying the invention within its scope.

In a first stage the formation of the acid phosphate of monoethanolamine is obtained in solution:

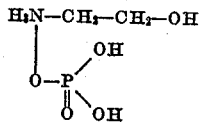

By dehydrating this compound at high temperature under vacuum, the desired ester is obtained:

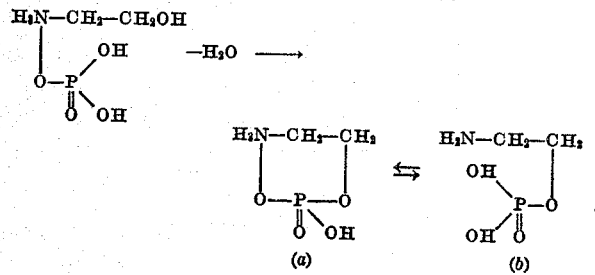

In the foregoing equation (a) and (b) represent tautomeric forms of ethanol-2-aminophosphoric acid which are formed depending on the acid or alkaline condition of the solution.

It has been found unexpectedly not only that dehydration takes place in the sense hereabove shown, but also that the output obtainable with this process is 90–95% while the processes mentioned hereinbefore give outputs ranging about 50%.

Moreover, if the substances employed are pure, it is possible to obtain the acid in the pure crystalline form M. P. 232°–233° C. hydrate M. P. 140°–141° C.

Ethanol-2-aminophosphoric acid, either as such or in the form of its calcium, or disodium or dipotassium salts, can be employed, for instance, in the preparation of pharmaceutical tonic and antianemic products.

*Example.*—24.4 kgs. of a 50% aqueous solution of monoethanolamine are mixed with a 50% aqueous solution of phosphoric acid, cooling so that the temperature does not rise above 10° C.

The solution is then concentrated under vacuum in oil bath. The inner temperature of the mass is brought up progressively to 185° C. and this temperature is maintained for 3 hours.

The thick molten mass, if not already crystallized, is discharged and caused to crystallize by adding a small quantity of boiling water, and consequently is filtered and dried. 31 kgs. of dried product are obtained. M. P. 232°–233° C. with decomposition. Nitrogen content 9.5%. The acid can be further purified by dissolving it in water, treating with decoloring carbon and crystallizing it by addition of an excess of alcohol.

Its purification can be obtained also through the salts of calcium, sodium or potassium, which are obtained treating the aqueous solution of the acid with sodium carbonate or respectively potassium carbonate or calcium hydroxide up to pH 9.0 and concentrating then the solutions until crystallization takes place.

Other methods of carrying out the principle of this invention can be followed in the place of the one hereinabove explained, introducing variations in the process so as to carry out an equivalent process, our invention being limited and defined only by the appended claim.

Having now particularly described and ascertained the nature of our said invention and in what manner the same is to be performed, we declare that what we claim is:

A process for producing ethanol-2-aminophosphoric acid, comprising the steps of mixing monoethanolamine and orthophosphoric acid in aqueous solution at a temperature of not more than 10° C., then heating the mixture under vacuum at 185° C. for about 3 hours, and crystallizing the ethanol-2-aminophosphoric acid thus obtained.

References Cited in the file of this patent

Biochem. J., vol. 30, 197–201 (1936), cited in Chem. Abst., vol. 30, 3510 (1936).